US009482545B2

(12) United States Patent
Jo et al.

(10) Patent No.: US 9,482,545 B2
(45) Date of Patent: Nov. 1, 2016

(54) APPARATUS AND METHOD FOR PROVIDING USER'S ROUTE INFORMATION IN MOBILE COMMUNICATION SYSTEM

(71) Applicant: Samsung Electronics Co., Ltd., Gyeonggi-do (KR)

(72) Inventors: Hang-Cheon Jo, Incheon (KR); Young-Mi Do, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/282,679

(22) Filed: May 20, 2014

(65) Prior Publication Data

US 2014/0257698 A1 Sep. 11, 2014

Related U.S. Application Data

(63) Continuation of application No. 13/347,620, filed on Jan. 10, 2012, now Pat. No. 8,731,834.

(30) Foreign Application Priority Data

Jan. 10, 2011 (KR) ........................ 10-2011-0002160

(51) Int. Cl.
*G01C 21/36* (2006.01)
*H04M 3/42* (2006.01)
*H04W 4/02* (2009.01)

(52) U.S. Cl.
CPC ............... *G01C 21/36* (2013.01); *H04M 3/42* (2013.01); *H04M 3/42348* (2013.01); *H04M 2207/20* (2013.01); *H04M 2242/30* (2013.01)

(58) Field of Classification Search
CPC ...... G01C 21/36; H04W 4/02; H04W 4/028; H04Q 7/20
USPC .............. 701/538, 527, 411, 454; 455/456.6, 455/456.1, 456.2, 515; 340/539.13
See application file for complete search history.

(56) References Cited

U.S. PATENT DOCUMENTS

| 6,347,278 | B2 * | 2/2002 | Ito ................................. 701/411 |
| 6,633,809 | B1 * | 10/2003 | Aizono et al. ................. 701/454 |
| 7,741,968 | B1 * | 6/2010 | Tannenbaum et al. .. 340/539.13 |
| 2002/0034292 | A1 * | 3/2002 | Tuoriniemi et al. .......... 379/219 |

(Continued)

FOREIGN PATENT DOCUMENTS

| CN | 101174366 A | 5/2008 |
| CN | 101625244 | 1/2010 |

(Continued)

OTHER PUBLICATIONS

Extended European Search Report dated May 10, 2012 in connection with European Patent Application No. 12150534.1, 6 pages.

(Continued)

*Primary Examiner* — Tan Q Nguyen

(57) ABSTRACT

An apparatus and a method search a route using a portable terminal. A controller establishes a call connection with another party and exchanges positional information with the other party. An analyzing unit analyzes the route information using a first positional information of the portable terminal and a second positional information of the other party. A displaying unit outputs the route information analyzed by the analyzing unit. The controller provides the route information analyzed by the analyzing unit.

20 Claims, 6 Drawing Sheets

(56) References Cited

U.S. PATENT DOCUMENTS

| | | |
|---|---|---|
| 2003/0100326 A1* | 5/2003 | Grube et al. .................. 455/515 |
| 2003/0119522 A1 | 6/2003 | Barclay et al. |
| 2005/0277427 A1 | 12/2005 | Zhang |
| 2006/0227047 A1 | 10/2006 | Rosenberg |
| 2007/0191025 A1 | 8/2007 | McBrierty et al. |
| 2008/0114543 A1* | 5/2008 | Vishnu .......................... 701/209 |
| 2008/0195315 A1 | 8/2008 | Hu et al. |
| 2009/0125234 A1 | 5/2009 | Geelen et al. |
| 2009/0325603 A1* | 12/2009 | Van Os et al. ............. 455/456.2 |
| 2011/0264369 A1 | 10/2011 | Chang et al. |

FOREIGN PATENT DOCUMENTS

| | | |
|---|---|---|
| CN | 101873526 A | 10/2010 |
| JP | 2001141478 A | 5/2001 |
| JP | 2003097962 A | 4/2003 |
| KR | 10-2005-0048735 | 5/2005 |
| KR | 10-2010-0076346 | 7/2010 |
| WO | WO 03/008992 A2 | 1/2003 |
| WO | WO 2006/035755 A1 | 4/2006 |

OTHER PUBLICATIONS

Notice of Preliminary Rejection dated Aug. 4, 2015 in connection with Japanese Patent Application No. 2011-252291; 11 pages.
The First Office Action dated Sep. 6, 2015 in connection with Chinese Patent Application No. 201210022851.7; 15 pages.
Notice of Preliminary Rejection dated Feb. 16, 2016 in connection with Japanese Patent Application No. 2011-252291, 10 pages.
The Second Office Action dated Apr. 25, 2016 in connection with Chinese Patent Application No. 201210022851.7, 17 pages.
European Examination Report dated Apr. 5, 2016 in connection with European Application No. 12150534.1, 6 pages.
Notice of Preliminary Rejection dated Aug. 2, 2016 in connection with Japanese Patent Application No. 2011-252291; 6 pages.

\* cited by examiner

APPARATUS AND METHOD FOR PROVIDING USER'S ROUTE INFORMATION IN MOBILE COMMUNICATION SYSTEM

CROSS-REFERENCE TO RELATED APPLICATION(S) AND CLAIM OF PRIORITY

The present application is a continuation of prior U.S. patent application Ser. No. 13/347,620, filed on Jan. 10, 2012 which claims priority under 35 U.S.C. §119(e) to a Korean patent application filed in the Korean Intellectual Property Office on Jan. 10, 2011, and assigned Serial No. 10-2011-0002160. The entire disclosure of both these applications is hereby incorporated by reference.

TECHNICAL FIELD OF THE INVENTION

The present invention relates to an apparatus and a method for searching a route of a portable terminal, and in particular, an apparatus and a method in which a user located at a destination verifies the positional information of other user moving toward the destination and the other user moving toward the destination verifies a route to the user located at the destination.

BACKGROUND OF THE INVENTION

Currently, portable terminals are used regardless of sex or age as a necessity for modern life, and providers of services and manufacturers of terminals are developing goods or services competitively for differentiating their goods or services from competitors.

For example, some portable terminals have advanced to a multimedia device that may provide various services such as phone book, short message service, e-mail, morning call, MP3, management of schedule, digital camera, and wireless internet service.

And also, portable terminals may receive satellite signal and access to traffic information system for providing traffic report, or may provide some user with a navigation function to provide some information of a specific route.

The above-mentioned navigation function is to provide a route between a departure point and arrival destination point based on map data and, therefore, a user who cannot analyze map data may have difficulty in finding a destination. That is, a user who utilizes the above-mentioned navigation function may have some problem in that the user can reach the approximate location of a destination but may have difficulty in finding the exact point where the other party is located.

Also, the above-mentioned navigation function provides a route based on position and, hence, may have some problem that one user located at a destination and the other user moving to the destination cannot verify a route and the positional information for each other. And consequently, the users cannot verify whether or not the other party moves along an exact route.

Therefore, for resolving the above mentioned problem, it is necessary to provide an apparatus and a method for sharing positional information related to a route of a user to perform call connection in a mobile telecommunication system.

SUMMARY OF THE INVENTION

To address the above-discussed deficiencies of the prior art, it is a primary object to provide to provide at least the advantages described below. Accordingly, an aspect of the present disclosure is to provide an apparatus and method for sharing the positional information of a user in a mobile telecommunication system.

Another aspect of the present disclosure is to provide an apparatus and a method for verifying the positional information of a user moving toward the other user using a portable terminal of the other user located at a destination.

Another aspect of the present disclosure is to provide an apparatus and a method for providing a route to a user located at a destination in a portable terminal moving toward the destination.

Another aspect of the present disclosure is to provide an apparatus and a method for sharing the positional information of a user with an augmented reality method in a mobile telecommunication system.

In accordance with an aspect of the present disclosure, an apparatus to provide route information in a portable terminal is provided. The apparatus includes a controller, an analyzing unit, and a displaying unit. The controller establishes a call connection with another party and exchanges positional information with the other party. The route analyzing unit analyzes the route information using a first positional information of the portable terminal and a second positional information of the other party. The displaying unit outputs the route information analyzed by the route analyzing unit. The controller controls the display unit outputs the route information analyzed by the route analyzing unit to the displaying unit.

In accordance with another aspect of the present disclosure, a method for providing route information in a portable terminal is provided. A call connection is established with another party. Positional information is exchanged with the other party. Route information is provided using a first positional information and a second positional information of the other party.

In accordance with yet another aspect of the present disclosure, a non-transitory computer-readable medium for use in a portable device is provided. The non-transitory computer-readable medium is coupled to a controller and is configured to store a plurality of instructions. The plurality of instructions cause the controller to establish a call connection with another party, exchange positional information with the other party, and provide route information using a first positional information of the portable terminal and a second positional information of the other party.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain embodiments of the present invention will be more apparent from the following detailed description taken in conjunction with the accompanying drawings, in which.

Throughout the drawings, like reference numerals will be understood to refer to like parts, components and structures.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure.

Embodiments of the present disclosure will be described herein below with reference to the accompanying drawings. In the following description, well-known functions or constructions are not described in detail since they would obscure the invention in unnecessary detail.

An apparatus and a method for performing call connection and sharing the positional information of a user in a mobile telecommunication system will be described herein below, and an apparatus and a method for verifying the positional information of a user moving toward a place where another user is located in a portable terminal of the other user located at the destination and for providing a route to the other user located at the destination in the portable terminal moving toward the destination will be described according to an embodiment of the present disclosure.

Figure 1:
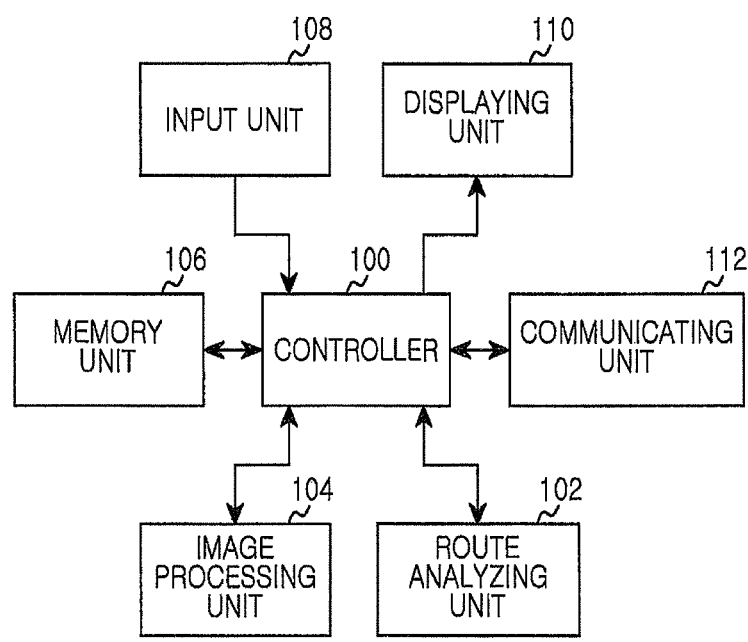
FIG. 1 illustrates a portable terminal for sharing the positional information of a user in a mobile telecommunication system according to an embodiment of the present disclosure.

FIG. 1 illustrates a portable terminal for sharing the positional information of a user in a mobile telecommunication system according to the present disclosure.

Referring to FIG. 1, a portable terminal may comprise a controller 100, a route analyzing unit 102, an image processing unit 104, a memory unit 106, an input unit 108, a displaying unit 110 and a communicating part 112.

The controller 100, which may be implemented as one or more processors, controls the overall operation of the portable terminal. For example, the controller 100 may execute, process, and control for voice communication and data communication, and the controller 100 may process, in addition to general functions, sharing of the positional information related to a user performing call connection and provision of a route to a destination.

In the above mentioned situation, the portable terminals may be classified as one portable terminal located at a destination and the other portable terminal moving toward the destination, and consequently the operation of the controller 100 will described separately.

At first, the controller 100 of the portable terminal moving to a destination may share positional information with a portable terminal located at the destination, if a route to the destination is required during performance of a call connection. Next, the controller 100 sets its positional information as a starting point and sets the positional information of the other party located at the destination as the destination to find a route to the destination. In course, the controller 100 may provide its positional information to the other party located at the destination and make its position moving toward the destination be found until reaching the destination.

also In addition, the controller 100 of the other portable terminal located at the destination may share its positional information with the portable terminal moving toward the destination if the route to the destination is required during performance of call connection. In turn, the controller 100 may set its positional information as the destination and set the positional information of the other party moving toward the destination as the starting point, to find the position of the other party moving toward the destination. In the course, the controller 100 may obtain positional information until the other party moving toward the destination reaches the destination and find the position of the other party moving toward the destination. As such, the user moving toward the destination may find the exact position of the other party and may move along a particular route to the destination, and the user located at the destination may check whether the other party moves toward his position along the particular route.

The route analyzing unit 102 of the portable terminal may determine a route from the starting point to the destination based on the instruction of the controller 100. That is, the route analyzing unit 102 may obtain the positional information of the other party and its own positional information and determine a route to the destination or the position of the user moving toward the destination.

The image processing unit 104 may process the output of the route and the position of the user determined by the route analyzing unit 102 at an output screen, namely at the displaying unit 110 in response to the instruction of the controller 100. That is, the image processing unit 104 of the portable terminal moving toward the destination may process the output of the positional information of the user, the changed positional information of the user until reaching the destination, and the route to destination using map data or augmented reality method.

Additionally, the image processing unit 104 of the portable terminal located at the destination may process the output of the changed positional information of the user moving toward its location using map data or augmented reality method.

The memory unit 106 of the portable terminal is a non-transitory computer-readable medium and may comprise ROM, RAM, and/or flash ROM. ROM may store a micro-code of program and various reference data for processing and controlling the route analyzing unit 102 and the image processing unit 104.

RAM corresponding to the working memory of the controller 100 may store temporary data generated during the process of the various program. Flash ROM may store various filing data that can be updated and may comprise at least one of a telephone book, outgoing and incoming messages, and touch input point information of a user. The memory unit 106 may also store map data for finding a route of a user according to an embodiment of the present disclosure.

The input unit 108 may comprise one or more numeric key buttons from zero to nine, a menu button, a cancel button, a confirm button, a call button, a end button, an internet access button, a navigation key (or direction key) button, one or more character input keys, one or more function keys, and such. The input unit 108 may provide the controller 100 with key input data corresponding to the key that is pressed by a user, and generate input data for sharing positional information according to an embodiment of the present disclosure.

The displaying unit 110 may display status information during the operation of the portable terminal, alphanumeric characters, a video, an image, and such. The displaying unit 110 may output the positional information of a user moving toward a destination and positional information with map data and augmented reality method according to an embodiment of the present disclosure. The displaying unit 110 may output data with color liquid crystal display apparatus, AMOLED, and such. And the displaying unit 110 may comprise a touch input apparatus to use as an input apparatus when the displaying unit 110 is applied for a touch input type of portable terminal.

The communicating unit 112 may perform a function to process a wireless signal of data input and output through an antenna (not illustrated). For example, the communicating unit 112 may perform a function to RF-process and transmit after channel-coding and spreading data to be transmitted in a transmitting mode. In the receiving mode, the communicating unit 112 may perform a function to recover data after converting the received RF signal into baseband signal, spreading and channel-decoding the baseband signal. The communicating unit 112 may also perform a function to share positional information with the other party.

The function of the route analyzing unit 102 and the image processing unit 104 may be performed by the controller 100 of the portable terminal, but the above-mentioned embodiment in which each component is separately described functionally is not intended to limit the scope of the present disclosure, but rather for easy understanding of an example according to the present disclosure. Therefore a person skilled in this art may recognize that it is possible for various modifications to be made without departing from the scope of the present disclosure. For example, in an embodiment, all of the functions described above may be processed by the controller 100.

Figure 2:
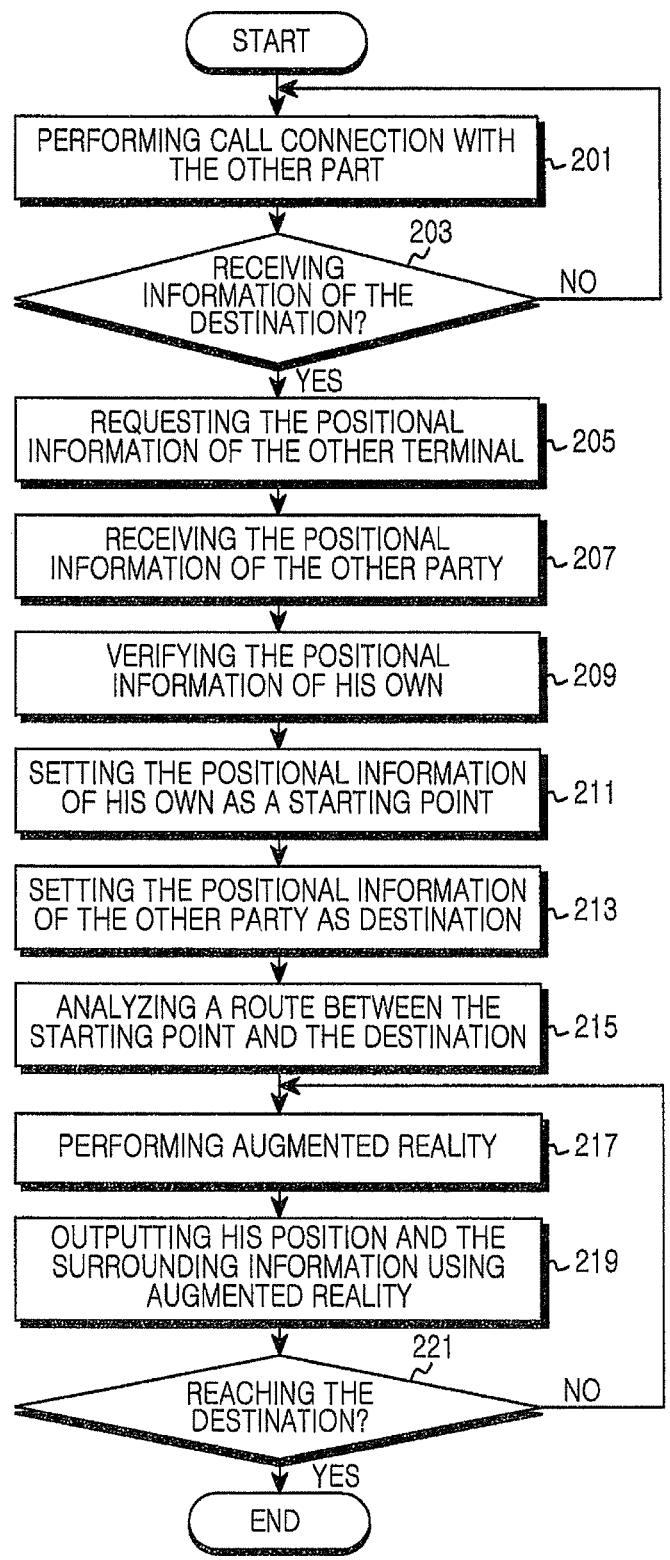
FIG. 2 illustrates a process for providing route information related to a destination in a portable terminal according to an embodiment of the present disclosure.

FIG. 2 illustrates a process for providing route information related to a destination in a portable terminal according to an embodiment of the present disclosure.

Referring to FIG. 2, In step 201, the portable terminal establishes a call connection with the other party through the terminal of the other party moving toward the destination, and checks whether it receives the information of the destination from the other party in step 203. In the above, some circumstance to receive the information of the destination means the circumstance to receive information related to an area in which the other party is located. For example, in some circumstance that an appointed place cannot be find, the positional information of the other party who has reached the appointed place can be requested and received.

If the destination information is not received in the step 203, the portable terminal may proceed to the step 201 and maintain the call connection that has already been established.

Meanwhile, if the portable terminal receives the destination information, the portable terminal may proceed to step 205 for requesting the positional information to the other party and proceed to step 207 for receiving the positional information from the other party.

In step 209, the portable terminal verifies the positional information and proceeds to step 211 for setting its position as a starting point using the verified positional information. In step 213, the portable terminal sets the positional position of the other party as a destination, and then may analyze the route between the starting point and the destination. That is, the portable terminal can analyze the route to the destination corresponding to the position of the other party based on its own position.

In step 217, the portable terminal operates a camera module and performs the function of augmented reality and in turn may proceed to step 219 for outputting the present position and the information of the surroundings using augmented reality.

In step 221, the portable terminal verifies whether the portable terminal of the other party reaches the destination.

If it is not confirmed that the portable terminal of the other party reached the destination during the performance of step 221, the portable terminal may proceed to step 217 once more for providing the route to the destination using augmented reality method.

Meanwhile, the portable terminal may terminate the above-mentioned algorithm if the portable terminal verified that the portable terminal of the other party had reached the destination.

Figure 3:
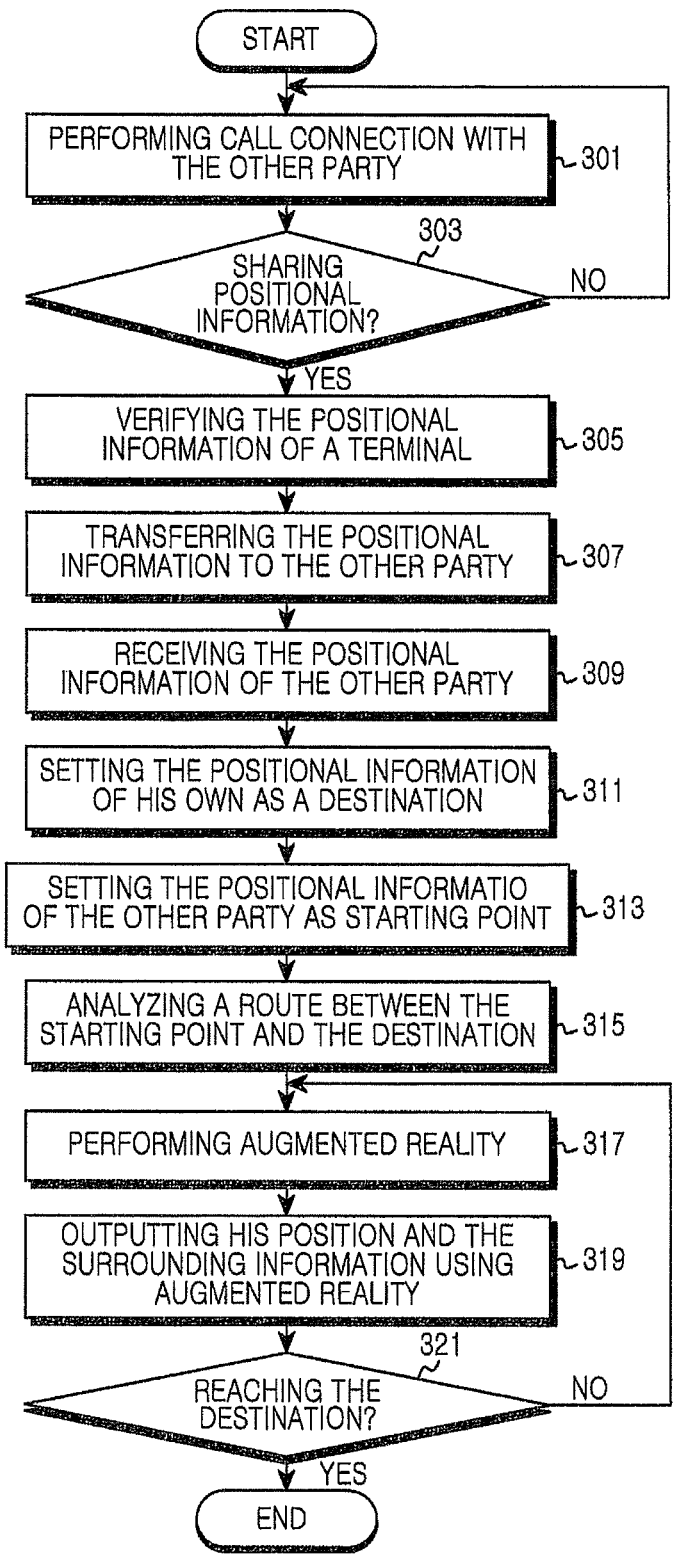
FIG. 3 illustrates a process to verify the position of the other party in a portable terminal according an embodiment of the present disclosure.

FIG. 3 illustrates a process to verify the position of the other party in a portable terminal according to an embodiment of the present disclosure.

Referring to FIG. 3, the portable terminal may perform a call connection with the portable terminal of the other party located at the destination in step 301 and then proceed to step 303 for verifying whether some circumstance in which the sharing of positional information is required happens.

In the above, the above-mentioned circumstance in which the sharing of positional information is required means a circumstance in which the other party is provided with the positional information of the first party and an exact movement of the other party is checked.

If it is not verified that the share of positional information is required in step 303, the portable terminal may return to step 301.

Meanwhile, if it is verified that the share of positional information is required, the portable terminal may proceed to step 307 for transmitting its verified position to the other party after the portable terminal checks its positional information in step 305.

In step 309, the portable terminal receives the positional information of the other party and may proceed to step 311 for setting its positional information as a destination.

In step 313, after the portable terminal sets the positional information of the other party as a starting point, the portable terminal may proceed to step 315 for analyzing a route between the starting point and the destination.

In the above, the portable terminal sets his position as the destination for verifying the route of the other party and checks the position of the other party moving toward the destination.

In step 317, the portable terminal operates a camera module and performs the function of augmented reality and then may proceed to step 319 for processing output of the positional information of the other party using augmented reality method.

In step 321, the portable terminal checks whether the other party has reached the destination.

If the portable terminal does not verify that the other party reaches the destination in step 321, the portable terminal may return to step 317 and provide the position transition until arriving at the destination of the other party using augment reality method. That is, the portable terminal may receive the positional information of the other party in a predetermined time interval until the other party reaches the destination.

Meanwhile, the portable terminal may terminate the above algorithm if the portable terminal confirms that the other party has reached the destination in step 321.

Figure 4:
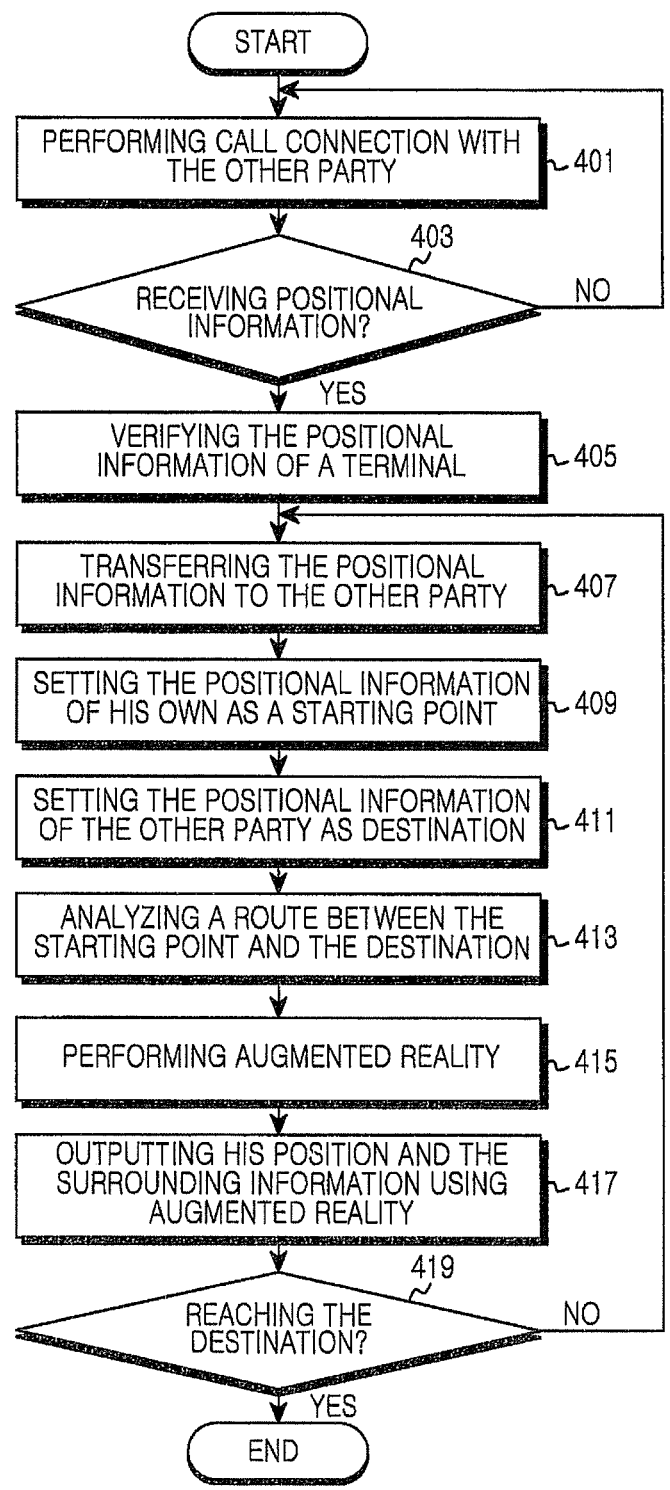
FIG. 4 illustrates a process to verify the position of a destination in a portable terminal according to an embodiment of the present disclosure.

FIG. 4 illustrates a process to verify the position of a destination in a portable terminal according to an embodiment of the present disclosure.

Referring to FIG. 4, the portable terminal may provide its changing positional information until arriving at the destination with the terminal of the other party moving toward the destination. In step 401, the portable terminal establishes a call connection with the other party at first and then may proceed to step 403 for checking whether the positional information is received from the other party located at the destination.

If it is not confirmed that positional information from the other party is received in step 403, the portable terminal may return to step 401.

Meanwhile, the portable terminal may proceed to step 405 for checking its positional information and then may proceed to step 407 for transmitting its verified position to the other party, if it is confirmed that the positional information from the other party is received in step 403.

In step 409, the portable terminal sets its positional information as a starting point and may proceed to step 411 for setting the positional information of the other party as a destination.

In step 413, the portable terminal analyzes a route between the starting point and the destination.

In the above, the portable terminal sets the position of the other party as the destination in order to move toward the position of the other party.

In step 415, the portable terminal operates a camera module and performs the function of augmented reality method. In step 417, the portable terminal outputs its position and the information of the surroundings with augmented reality method.

In step 419, the portable terminal checks whether the other party has reached the destination.

The portable terminal may return to step 407 for transmitting its changing position to the other party, and hence the other party can find the changed position of the portable terminal, until it is not confirmed that the other party has reached the destination in step 419.

Meanwhile, the portable terminal may terminate the above-mentioned algorithm, if it is confirmed that the other party has reached the destination in step 419.

Figure 5A:
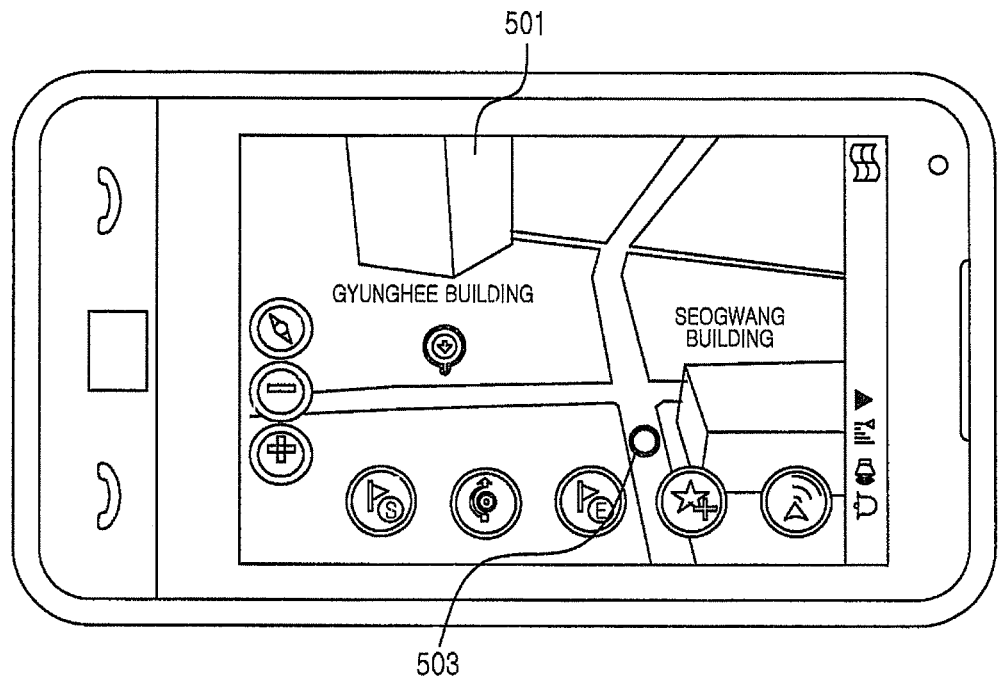
FIG. 5A illustrates a display screen to verify the position of the other party with map data in a portable terminal according to an embodiment of the present disclosure.

FIG. 5A illustrates a display screen to verify the position of the other party with map data in a portable terminal according to an embodiment of the present disclosure.

Referring to FIG. 5A, the portable terminal may confirm the position of the other party moving toward its position using general map data.

As shown in the drawing, the portable terminal may process the output of the route of the other party based on its position in a map data.

In the above, the portable terminal may set its position as a destination 501 and set the position of the other party as a starting point and then may check the route of the other party.

With this, the user of the portable terminal can check whether the other party moves along a particular route toward its position, and if the other party deviates from the route accidently, the user may guide the other party back onto the route.

That is, the user of the portable terminal may verify the other party 503 moving relative to its position 501, and (assuming the other party 503 is moving up on the screen) the user may consider that the user can reach the destination (i.e. the position of the user's portable terminal) by turning left at the corner. But if the other party turns right at the corner, the user of the portable terminal recognizes the other party has deviated from the route and may inform the other party of an proper route to reach the destination.

As mentioned above, while the user of portable terminal may perform a call connection with the other party, the user of the portable terminal may provide the route by exchanging (sharing) the positional information, and the user can provide the route by exchanging the positional information automatically (for example, with short message) until the function of route guide is ended regardless of the termination of the call connection.

Figure 5B:
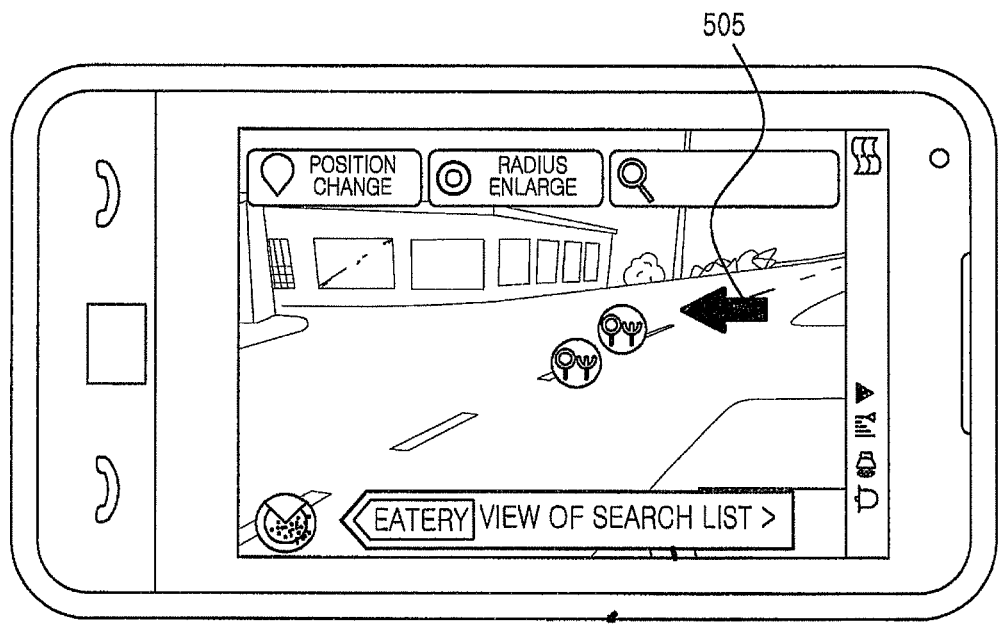
FIG. 5B illustrates a display screen to verify the position of the other party with augmented reality method in a portable terminal according to an embodiment of the present disclosure.

FIG. 5B illustrates a display screen to verify the position of the other party with augmented reality in a portable terminal according to an embodiment of the present disclosure.

Referring to FIG. 5B, the portable terminal may verify the position of the other party moving toward its position with augmented reality method.

As shown in the drawing, the portable terminal may receive a real image of the surroundings of its position with a camera module and utilize an augmented reality method in which the important information of the surroundings is designated as a virtual icon 505 and displayed.

With this, the user of the portable terminal may check the direction in which the user is moving through the image of surroundings and verify some different positional information than the map data illustrated in FIG. 5A.

That is, the user of the portable terminal may speculate the route of the other party by verifying the arrow which shows the other party to in a particular direction (e.g. the right direction icon 505) on basis of his surroundings.

Figure 6:
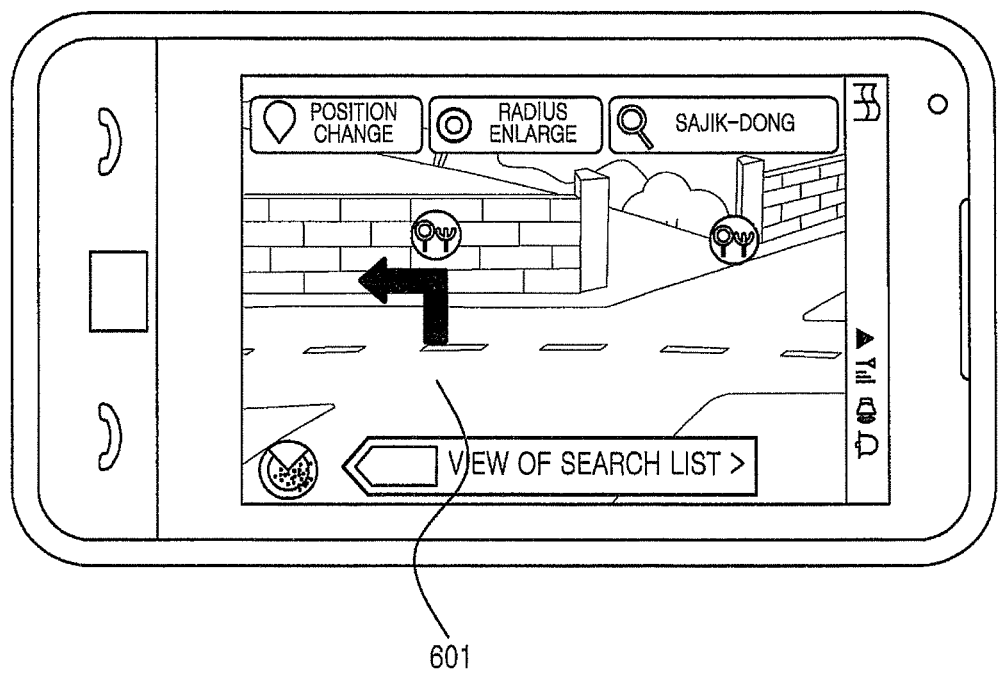
FIG. 6 illustrates a display screen to verify the position of a destination in a portable terminal according to an embodiment of the present disclosure.

FIG. 6 illustrates a display screen to verify the position of the destination in a portable terminal according to an embodiment of the present disclosure.

Referring to FIG. 6, the portable terminal may receive positional information from the other party for verifying a route to a destination during a call connection with the other party located at the destination and may check a route to the position of the other party.

The portable terminal which checks the route may obtain the real image of the surroundings of his position with a camera and may provide 601 a route to the destination through an augmented reality interface in which the important information of surroundings is designated as a virtual icon and displayed. In addition, the portable terminal may provide its position information to the other party until the other party reaches the destination, and the other party may determine a moving position of the portable terminal.

As described in detail, the purpose of the present disclosure is to provide an apparatus and a method for one portable device to share its position information with the other party performing a call connection in a mobile telecommunication, and according to embodiments of the present disclosure, it is possible to verify the positional information of a first user who moves toward a second user's position in the portable terminal of the second user located at the destination, to provide a route for reaching the second user located at the destination in the portable terminal of the first user moving toward the destination, and to check the positional information along the route of the user who performs the call connection While the present disclosure has been particularly shown and described with reference to embodiments thereof, it will be understood by those skilled in the art that various changes in form and details may be made therein without departing from the spirit and scope of the present disclosure as defined by the appended claims.

What is claimed is:

1. A method comprising:
   obtaining, at an electronic device, first information associated with a position of another electronic device;
   capturing, by a camera of the electronic device, an image of the electronic device's surroundings;
   setting, at the electronic device, a first setting or a second setting, wherein a position of the electronic device is set as a starting point and the position of the other electronic device is set as a destination in the first setting, and the position of the electronic device is set as the destination and the position of the other electronic device is set as the starting point in the second setting;
   determining, at the electronic device, a route between the position of the other electronic device and a position of the electronic device using the first information and second information associated with the position of the electronic device, based at least in part on a determination that at least one of the first information or the second information is changed; and
   providing the route displayed differently according to a setting set between the first setting and the second setting and displayed using an augmented reality and the captured image via a display operatively coupled with the electronic device.

2. The method of claim 1, wherein the obtaining comprises:
   establishing, at the electronic device, a communication connection with the other electronic device.

3. The method of claim 1, wherein the determining comprises:
   determining the destination based on one of the first information or the second information and determining the starting point based on the other of the first information or the second information; and
   determining the route between the starting point and the destination.

4. The method of claim 1, further comprising:
   transmitting the second information to the other electronic device.

5. The method of claim 1, wherein at least one of the first information or the second information is shared with the other electronic device regardless of a state of a communication connection associated with the electronic device.

6. The method of claim 1, wherein the determining the route comprises:
   determining the route periodically until at least one of the electronic device or the other device reaches the destination.

7. The method of claim 1, wherein the providing comprises:
   identifying the position of the other electronic device.

8. The method of claim 7, wherein the identifying further comprises:
   updating the position of the other electronic device.

9. The method of claim 1, wherein the providing comprises:
   providing an indication based on a determination that the other device has deviated from the route.

10. The method of claim 1, wherein the providing comprises:
    providing using at least one of a map data, or a message.

11. An apparatus comprising:
    a display;
    a camera configured to capture an image of the apparatus's surroundings; and
    a controller operatively coupled to the display and the camera, the controller configured to:
       obtain first information associated with a position of another apparatus;
       set first setting or second setting, wherein a position of the apparatus is set as a starting point and the position of the other apparatus is set as a destination in the first setting, and the position of the apparatus is set as the destination and the position of the other apparatus is set as the starting point in the second setting;
       determine a route between the position of the other apparatus and a position of the apparatus using the first information and second information associated with the position of the apparatus, based at least in part on a determination that at least one of the first information or the second information is changed; and
       provide the route displayed differently according to a setting set between the first setting and the second setting and displayed using an augmented reality and the captured image via the display.

12. The apparatus of claim 11, wherein the controller is configured to:
    establish a communication connection with the other apparatus.

13. The apparatus of claim 11, wherein the controller is configured to:
    determine the destination based on one of the first information or the second information and determine the starting point based on the other of the first information or the second information; and
    determine the route between the starting point and the destination.

14. The apparatus of claim 11, wherein the controller is configured to:
    cause a transmitter or transceiver to transmit the second information to the other apparatus.

15. The apparatus of claim 11, wherein the controller is configured to:
    cause a transmitter or transceiver to send at least one of the first information or the second information to the other apparatus regardless of a state of a communication connection associated with the apparatus.

16. The apparatus of claim 11, wherein the controller is configured to:

determine the route periodically until at least one of the apparatus or the other apparatus reaches the destination.

17. The apparatus of claim 11, wherein the controller is configured to:
provide, via the display, the position of the other apparatus.

18. The apparatus of claim 17, wherein the controller is configured to:
update, via the display, the position of the other apparatus.

19. The apparatus of claim 11, wherein the controller is configured to:
provide an indication based on a determination that the other apparatus has deviated from the route.

20. A machine-readable storage device storing instructions that, when executed by one or more processors, cause the one or more processors to perform operations comprising:
obtaining, at an electronic device, first information associated with a position of another electronic device;
capturing, by a camera of the electronic device, an image of the electronic device's surroundings;
setting, at the electronic device, first setting or second setting, wherein a position of the electronic device is set as a starting point and the position of the other electronic device is set as a destination in the first setting, and the position of the electronic device is set as the destination and the position of the other electronic device is set as the starting point in the second setting;
determining, at the electronic device, a route between the position of the other electronic device and a position of the electronic device using the first information and second information associated with the position of the electronic device, based at least in part on a determination that at least one of the first information or the second information is changed; and
providing the route displayed differently according to a setting set between the first setting and the second setting and displayed using an augmented reality and the captured image via a display operatively coupled with the electronic device.

* * * * *